(12) United States Patent
Saka et al.

(10) Patent No.: US 11,328,120 B2
(45) Date of Patent: May 10, 2022

(54) IMPORTING TEXT INTO A DRAFT EMAIL

(71) Applicant: VMware, Inc., Palo Alto, CA (US)

(72) Inventors: Ratna Paul Saka, Atlanta, GA (US); Bilal Ilyas Dar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/014,477

(22) Filed: Sep. 8, 2020

(65) Prior Publication Data

US 2022/0075937 A1    Mar. 10, 2022

(51) Int. Cl.
  *G06F 40/205*    (2020.01)
  *H04L 51/42*    (2022.01)
  *G06F 3/04842*    (2022.01)

(52) U.S. Cl.
  CPC ............ *G06F 40/205* (2020.01); *H04L 51/22* (2013.01); *G06F 3/04842* (2013.01)

(58) Field of Classification Search
  CPC ..... H04L 51/22; G06F 3/04842; G06F 40/205
  See application file for complete search history.

(56) References Cited

U.S. PATENT DOCUMENTS

| | | | | |
|---|---|---|---|---|
| 2012/0131520 | A1* | 5/2012 | Tang | G06K 9/2081 715/863 |
| 2014/0044365 | A1* | 2/2014 | Chaudhury | G06K 9/6857 382/229 |
| 2014/0056475 | A1* | 2/2014 | Jang | G06K 9/2081 382/103 |
| 2015/0254518 | A1* | 9/2015 | Griffin | G06F 40/166 382/229 |
| 2016/0098611 | A1* | 4/2016 | Gray | G06K 9/6215 382/229 |
| 2017/0357627 | A1* | 12/2017 | Peterson | G06F 7/023 |
| 2020/0202159 | A1* | 6/2020 | Zhou | G06Q 10/107 |

* cited by examiner

*Primary Examiner* — Seth A Silverman
(74) *Attorney, Agent, or Firm* — Clayton, McKay & Bailey, PC

(57) ABSTRACT

Examples described herein include systems and methods for importing text into a draft email on a user device. In response to a user selecting the first selectable element, the user device can launch a camera interface on the display. The user can capture an image, such as a page of a book or newspaper, and then scale the captured image to the relevant desired portion. The example method can further include recognizing text within the scaled portion of the image and automatically importing the recognized text into the draft email. The user device can utilize a machine learning model to perform text recognition at the device and then insert the recognized text into the draft email automatically. The user device can also display an indication of the accuracy of the imported recognized text within the draft email.

20 Claims, 7 Drawing Sheets

*FIG. 5B*

IMPORTING TEXT INTO A DRAFT EMAIL

BACKGROUND

Email communication remains a primary mode of communication in both professional and personal settings. Frequently, a user wishes to quote or copy text from another source into a draft email. For example, an employee of an enterprise may want to forward the details of a hard-copy document to a coworker. In another example, a user may want to send a friend a paragraph from a book. In yet another example, a user may want to copy the text from a document and revise that text within an email.

Currently, a user faces a complex workflow for importing text from another source into a draft email. In the example of a hard-copy document, the user needs to scan the document, save the document in a particular format such as a portable document format ("PDF"), perform character recognition on that document, and then select, copy, and paste text from the document into the email. This process may require an external scanner or computer. If performed entirely on a handheld user device, the process can be cumbersome and time consuming.

As another example, if the user does not have time to follow the multiple time-consuming steps for converting a document into selectable text, the user may opt to simply take a picture of the text and use the picture in the draft email. However, this carries the obvious downside of not having editable text. In addition, the text within the picture may be harder to read than if the text were provided in an editable format. Pictures also tend to display (or not display) differently on different devices, whereas text is more likely to display accurately.

As a result, a need exists for a user-friendly method for importing text into a draft email on a user device.

SUMMARY

Examples described herein include systems and methods for importing text into a draft email on a user device. The user device can be any device that includes a hardware-based processor and a memory. The memory can store a non-transitory, computer-readable medium that is executed by the processor to perform various stages or actions.

For example, in one example method, the user device can display a draft email interface on a display of the user device. The draft email interface can be displayed within an application executing on the user device, such as an email application or a multi-purpose application that includes email functionality. The draft email interface can be launched when a user selects an option for drafting a new email or responding or forwarding an existing email, for example.

The example method can also include displaying, within the draft email interface, a first selectable element. The first selectable element can be a button or icon. For example, the first selectable element can be a camera icon or a document icon. In response to a user selecting the first selectable element, the user device can launch a camera interface on the display. The camera interface can have a button for taking a photograph using the camera on the user device. The user can select the button to capture an image, such as an image that includes text within it. For example, the image can be of a page of a book or newspaper, or a portion thereof.

Through the camera interface, the user can then scale the captured image to the relevant desired portion. For example, if the captured image includes two paragraphs of text, the user can manipulate scaling controls to draw a shape around one of those paragraphs. In that example, the additional steps of the method will be performed based on the scaled portion of the image.

The example method can further include recognizing text within the scaled portion of the image and automatically importing the recognized text into the draft email. The user device can utilize a machine learning model to perform text recognition at the device, without needing to rely on an external server to perform the recognition. The recognized text can be inserted into the draft email automatically, allowing the user to interact with the text by editing, copying, cutting, deleting, or otherwise manipulating the imported text.

In some examples, in addition to importing the recognized text into the draft email, the user device can also display an indication of the accuracy of the imported recognized text. For example, the user device can display a message indicating that the accuracy is good, fair, or poor.

In an example method, the draft email interface includes a second selectable element different than the first selectable element described above. When selected by the user, the second selectable element can cause the user device to launch a file-storage interface, such as a file explorer native to the device's operating system ("OS"). The user can then navigate to a desired file using the file-storage interface and select the file for text recognition. The user device can recognize text within that file and automatically import it into the draft email. From there, the user can modify the text as desired. In some examples, the selected file is stored remotely from the user device.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 5B is an illustration of an example GUI for importing text into a draft email on a user device.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
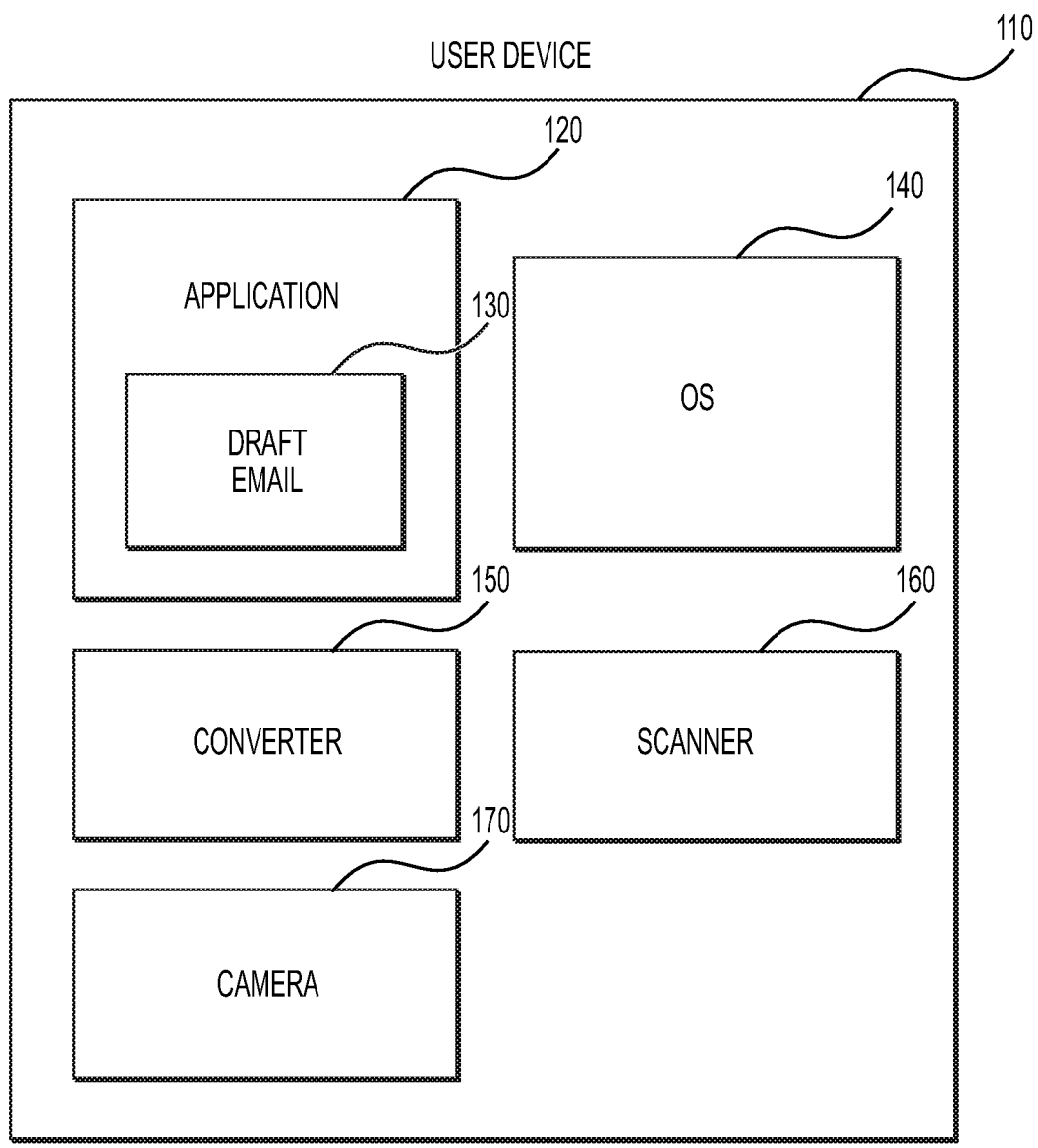
FIG. 1 is an illustration of an example system for importing text into a draft email on a user device.

FIG. 1 provides a representation of an example system for importing text into a draft email on a user device 110. FIG. 1 includes a user device 110, which can be any type of device that utilizes a hardware-based processor and a memory storage. Examples of typical user devices 110 include phones, computers (laptops and desktops), and tablets. In some examples, the user device 110 includes a display, such as a touchscreen, that allows a user to interact with the user device 110.

The user device 110 can include an operating system 140 that executes on the processor and provides an operating environment for the device 110. The operating system 140 can orchestrate the use of various functionalities described herein. For example, the operating system 140 can allow for execution of one or more applications, such as an email application 120 that allows a user to create a draft email 130. The email application 120 (also referred to as application 120) can be a standalone email application, or it can be an application with multiple functions. For example, the application 120 can provide access to stored files and enterprise information. In some examples, the application 120 can be a portal application that displays icons associated with various applications, providing access to those applications when selected and providing single-sign-on ("SSO") functionality by providing the user's credentials to those applications as needed.

The user device 110 can also include a camera 170 controlled by the operating system 140. The camera 170 can be used to capture static images or video by interacting with the display of the user device 140. The user device 110 can also include a scanner 160 function. The scanner 160 can be a software module, such as a subpart of the operating system 140. In some examples, the scanner 160 is a feature built into the operating system 140. In other examples, the scanner 160 is a separate application executing on the user device 110. The scanner 160 can provide functionality for transforming an image captured by the camera 170 into a document format, such as a Portable Document Format ("PDF").

The user device 110 can also include a converter 150, which can be a software module or application capable of interacting with various aspects of the user device 110. For example, the converter 150 can interact with the operating system 140 by requesting that the operating system 140 launch a camera interface and provide access to the camera 170. In another example, the converter 150 can analyze a document and perform various actions based on that document. For example, the converter 150 can recognize text within an image or document. The converter 150 can execute on the user device 110, making use of tools stored on the user device 110. For example, the converter 150 can utilize machine-learning models to analyze documents and recognize text within those documents.

The converter 150 can interact with the operating system 140 through use of an application programming interface ("API"), in an example. The API can provide access to the camera functionality. The API can also include access to the scanner 160 functionality in an example, with new machine learning models periodically being downloaded to the device for use with the operating system 140. The machine learning models can be updated to increase scanner 160 accuracy over time.

The machine-learning models can be stored on the user device 110 but can be trained remotely from the user device 110. In some examples, a management server provides one or more machine-learning models, updating the models over time based on feedback or other results. The machine-learning models can use character detection, character recognition, neural-network text detection, neural-network text recognition, natural language processing, or a combination of these techniques.

Figure 2:
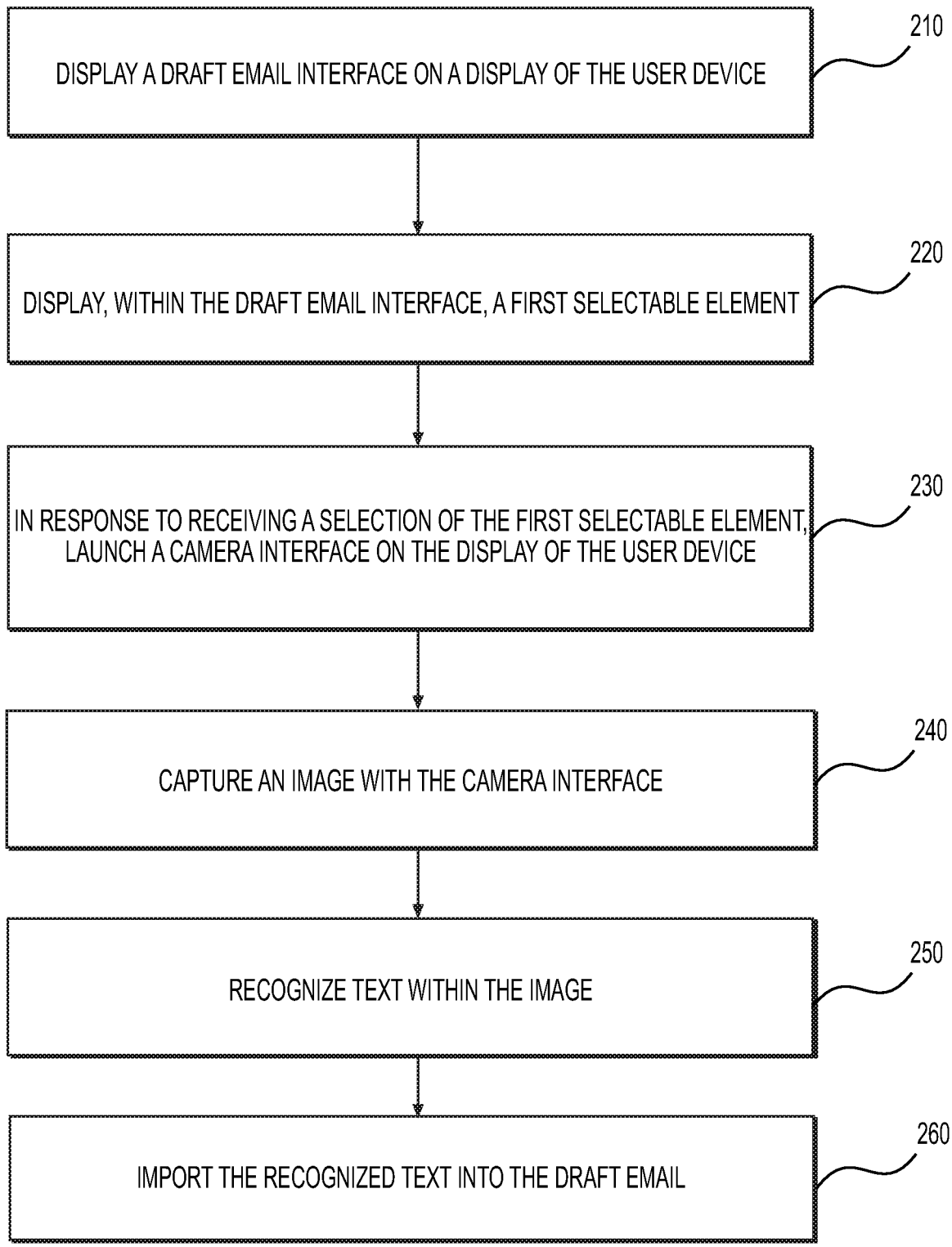
FIG. 2 is a flowchart of an example method for importing text into a draft email on a user device.

FIG. 2 provides a flowchart of an example method for importing text into a draft email 130 on a user device 110. At stage 210, the user device 110 can display a draft email interface, such as the interface shown at FIG. 5A. The draft email interface can include various fields, such as fields for "TO," "CC," "BCC," an email subject line, an email body, and other elements. For example, the draft email interface can include selectable elements that, when selected by the user, provide additional functionality related to drafting an email.

At stage 220, the email application 120 can display a first selectable element within the draft email interface. This stage can be performed simultaneously with stage 210 in some examples. In other examples, this stage can be performed in response to input from a user, such as by placing a text cursor within the body of the draft email 130. The first selectable element can cause the user device to capture image data from the camera 170 in some examples. In such an example, the first selectable element can include a camera icon to provide context to the user regarding its functionality. In another example, the first selectable element is displayed so as to indicate that the user can utilize the first selectable element for text-recognition purposes. This element is described in more detail with respect to FIG. 5A.

Stage 230 can include launching a camera interface on the display of the user device 110 in response to receiving a selection of the first selectable element. For example, when the user selects the first selectable element from the draft email interface, the operating system 140 can launch a camera interface on the display of the user device 110. In some examples, the camera interface is the same camera interface available to a user for taking pictures or video on the user device 110. The application 120 can activate the camera interface by making an API call to the operating system 140, in an example. The user can then direct the camera 170 toward a document with text, such as a standalone document, book, newspaper, or magazine.

At stage 240, the user can capture an image with the camera interface. The image can be captured by the user selecting an element on the camera interface or by selecting a button on the user device 110. In some examples, when an image is captured, an advanced camera interface can be displayed. The advanced camera interface can show a preview of the capture image, along with controls for modifying the image. For example, the interface can include movable anchors that can each be positioned to form an enclosed shape. The enclosed shape can be used to determine which text from the document should be imported into the draft email. This interface is described in more detail with respect to FIG. 5B.

At stage 250, the user device 110 can recognize text within the image. In some examples, this stage can include converting the captured image into a format that facilitates text recognition. This can include limiting conversion to the enclosed shape created by the moveable anchors. As an example, the scanner 160 functionality associated with the user device 110 can reformat the image into a document format, such as a PDF format. This stage can further include applying text-recognition techniques to the converted document to recognize text within that document. For example, the converter 150 functionality of the user device 110 can apply one or more machine-learning models to analyze the document.

The machine-learning models can be stored on the user device 110 but can be trained remotely from the user device 110. In some examples, a management server provides one or more machine-learning models, updating the models over time based on feedback or other results. In another example, the operating system 140 can collect information regarding changes to converted text. The changes can indicate an error in the converted text that requires modification. If multiple users make error corrections based on similar text, the system can determine that the applicable model needs to be changed or updated to stop making this type of error. This process can allow for updating the model based on a wide range of users and edits to conversions while minimizing privacy impacts. The machine-learning models can use character detection, character recognition, neural-network text detection, neural-network text recognition, natural language processing, or a combination of these techniques.

Stage 260 can include importing the recognized text into the draft email 130. This stage can include, for example, providing the recognized text from the converter 150 to the application 120. The application 120 can then paste the text into the draft email. In this example, the draft email is an email currently being drafted. The pasted text is therefore available to be edited by the user, such as by copying, cutting, highlighting, deleting, or adding to the text.

This can greatly improve workflow, especially on a mobile user device 110 such as a cell phone or tablet. For example, by reducing the need to switch between applications and retype or select specific text, a user can more quickly create and send emails based on other materials.

Figure 3:
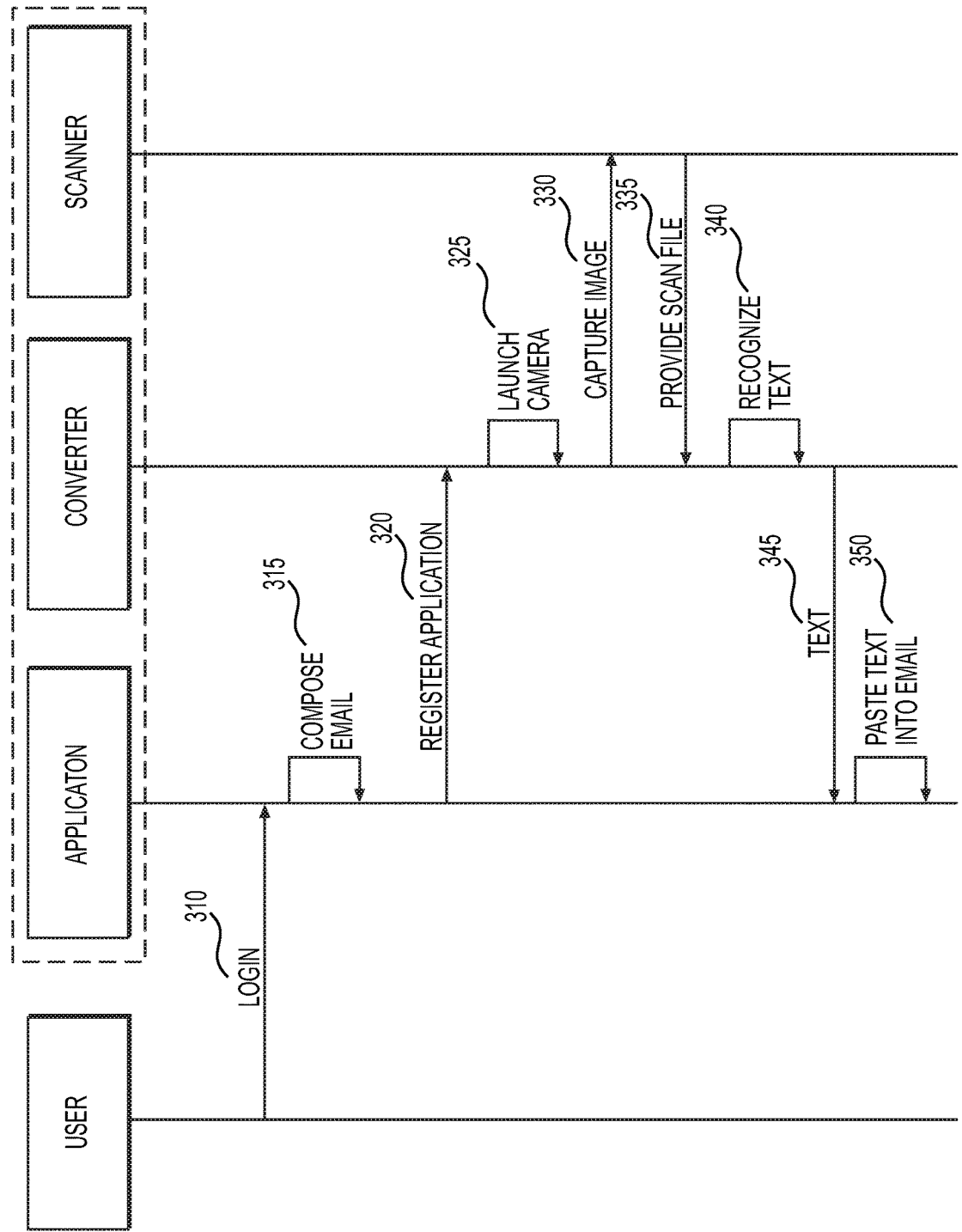
FIG. 3 is a sequence diagram of an example method for importing text into a draft email on a user device.

FIG. 3 provides a sequence diagram of an example method for importing text into a draft email 130 on a user device 110. At stage 310 of the example method, a user can log in to the application 120. This stage can include launching the application 120 and causing credentials to be provided to the application 120. While in some examples the user can manually type their credentials into an interface of the application 120, in other examples the credentials are provided as part of an SSO function. For example, a portal application that provides access to multiple applications can store the user's credentials and provide those credentials to the application 120. In some examples, the application 120 is accessed through the portal application. In other examples, the application 120 is a portal application.

At stage 315, the user can begin composing an email. This can be performed by, for example, selecting an option for a new email within the application 120 interface. That selection can launch a new window corresponding to a draft email. At stage 320, the application 120 can register with the converter 150. In some examples, this registration step is performed upon initial launch of the application 120. In other examples, the registration step is performed in response to the user selecting a graphical element of the draft email, such as a camera icon for importing text from a photograph taken with the camera 170.

Registration can include exchanging a token or certificate between the application 120 and converter 150, in one example. The token or certificate can allow for secured communication between the two components. In some examples, registration involves providing a user's credentials. In some examples, registration includes establishing a secured communication channel between the application 120 and converter 150, allowing for continued communication.

The registration stage 320 can include providing the application 120 with access to the camera 170. In some examples, this requires a request to the operating system. The operating system can prompt the user to allow the application 120 to access certain aspects of the user device 110, such as allowing access to the camera 170 and allowing the user device 110 to save photos to a memory storage location. In some examples, the user device 110 maintains a list of applications registered with the converter 150. In an example, a token is created and provided to the application 120. The token can be provided with various requests in order to authenticate the application 120, user, or user device 110.

At stage 325, the converter 150 can cause the camera 170 functionality of the user device 110 to be launched. This stage can be performed in response to the user selecting an element within the draft email interface, such as a camera icon. The selection of this element is described in more detail with respect to FIG. 5A. Once selected, the converter 150 instructs the operating system of the user device 110 to launch the camera 170 interface. The user can then orient the user device 110 such that the camera 170 is directed toward the desired text, such as within a book, brochure, newspaper, or paper document.

At stage 330, the user can capture an image by selecting an image capture element from the camera 170 interface. The captured image can be saved to a memory storage location of the user device 110. As part of stage 330, the capture image can be provided to the scanner 160 function of the user device 110. The scanner 160 can "scan" the file by transforming the image into a document format to facilitate text recognition. For example, the scanner 160 can reformat the image into a PDF, TXT, RFT, HTML, or DOC format, or any other suitable format. The reformatted file can be made available for the converter 150 at stage 335.

At stage 340, the converter 150 can recognize text within the formatted file. In one example, the converter 150 utilizes one or more machine-learning models to analyze the document. The machine-learning models can be stored on the user device 110, allowing the user device 110 to perform text recognition without contacting a remote server. This allows the example method to be performed irrespective of an internet or data connection for the user device 110. Performing the text recognition on the user device 110 also preserves bandwidth and speeds up the text recognition process.

While the machine-learning models utilized by the converter 150 can be stored on the user device 110, the models can be trained elsewhere. In one example, a machine-learning model is trained at a remote server using control information as an input to the model. After deployment to a user device 110, the machine-learning model can collect feedback from the user. For example, when a machine-learning model is used for text recognition and the user subsequently corrects an aspect of the recognized text, the user device 110 can identify that correction as feedback for the model. The correction can be provided to a training server, allowing for refinement of the model.

Various types of machine-learning models can be used to recognize text within the formatted file. For example, machine-learning models can use character detection, character recognition, neural-network text detection, neural-network text recognition, natural language processing, or a combination of these techniques.

At stage 345, the converter 150 can provide the recognized text to the application 120. This can be performed by utilizing functionality of the operating system, such as by copying the text to a temporary storage location, such as a clipboard, of the operating system. The operating system can then paste the text into the draft email 130 at stage 350, displaying the draft email 130 in the foreground of the interface along with the pasted text. The user can then interact with the text as desired, such as by formatting, editing, deleting, or adding to the text. Of course, the user can simply send the email without modifying the text in some examples.

Figure 5A:
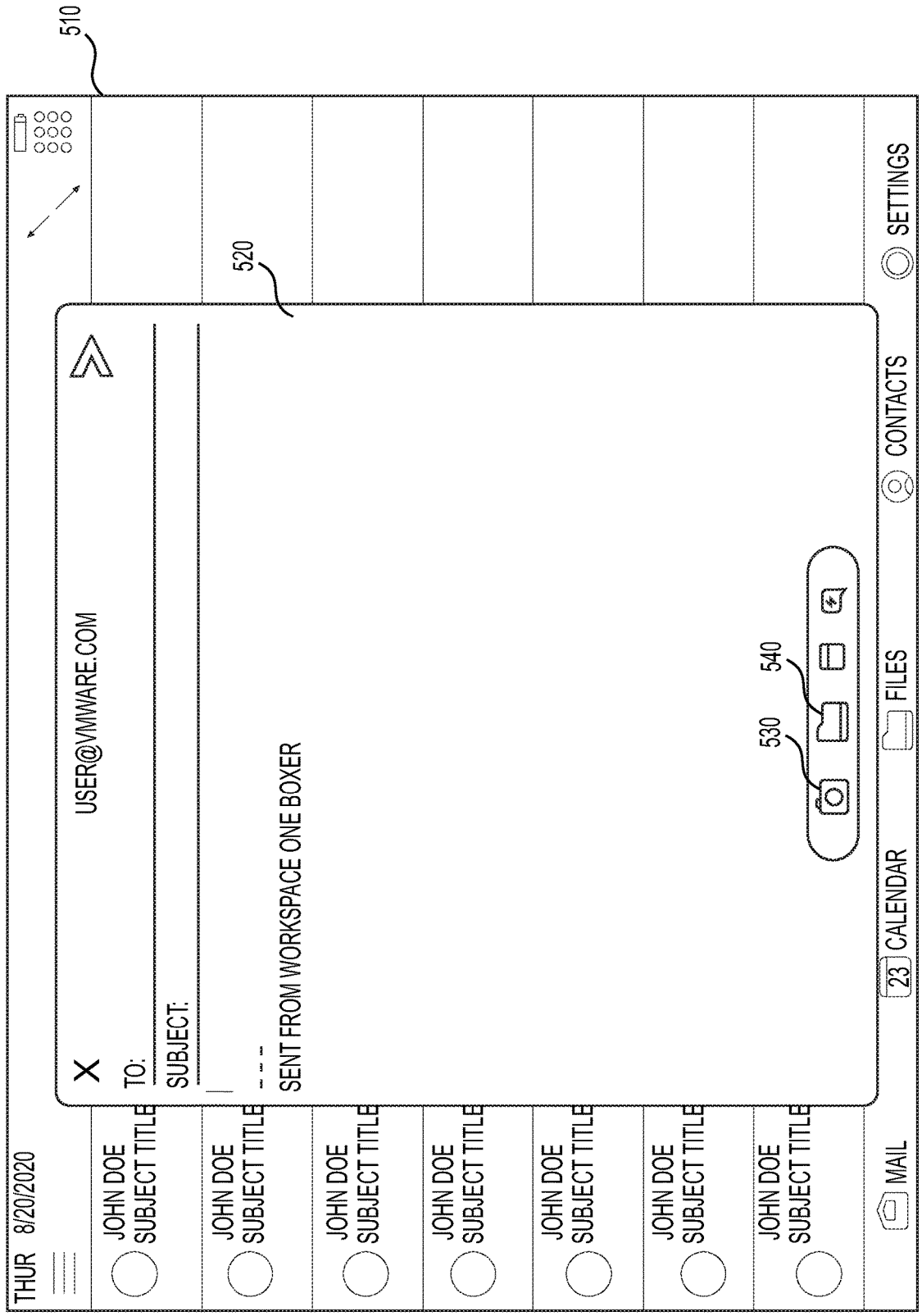
FIG. 5A is an illustration of an example graphical user interface ("GUI") for importing text into a draft email on a user device.
Figure 5B:
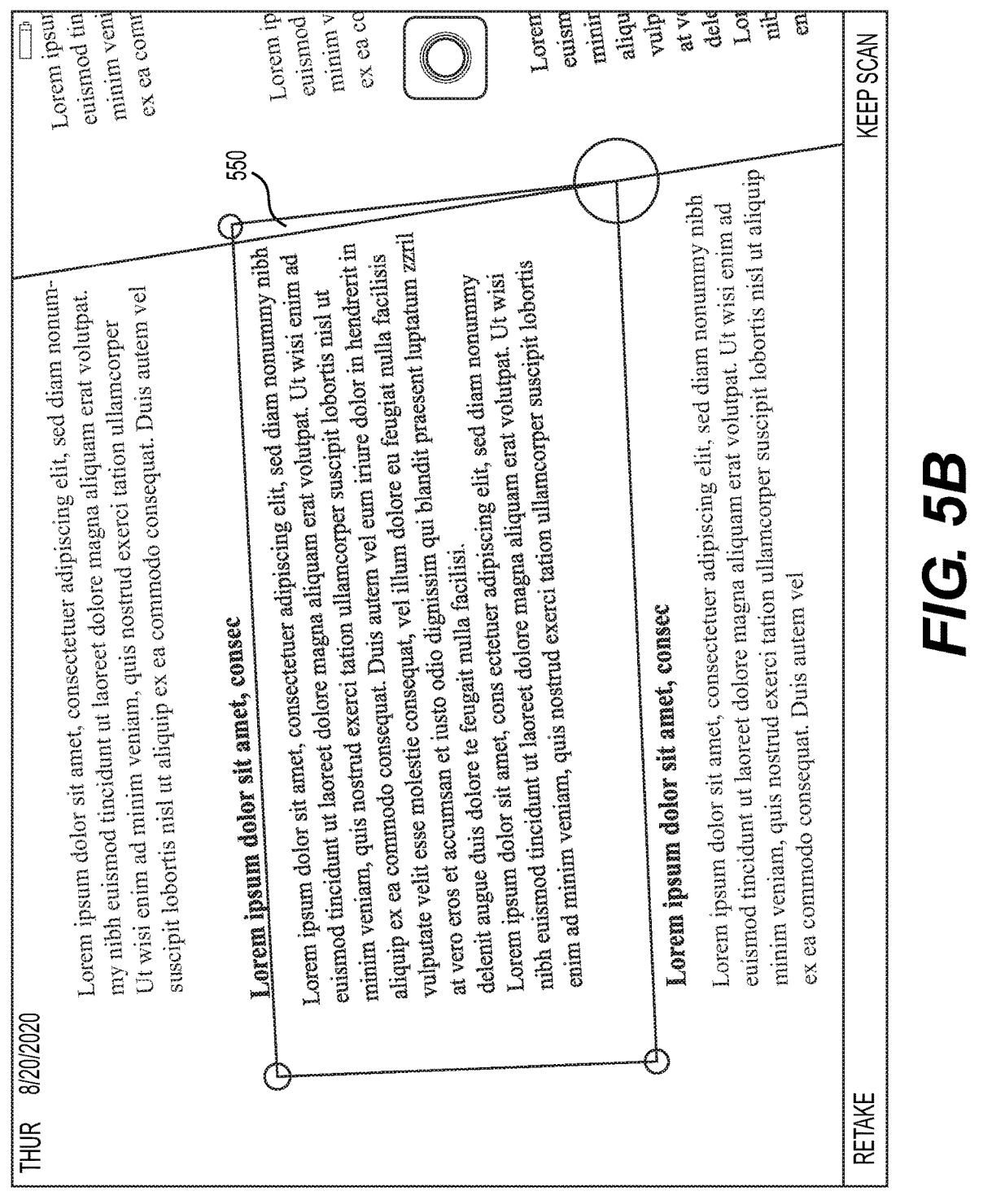
Figure 5C:
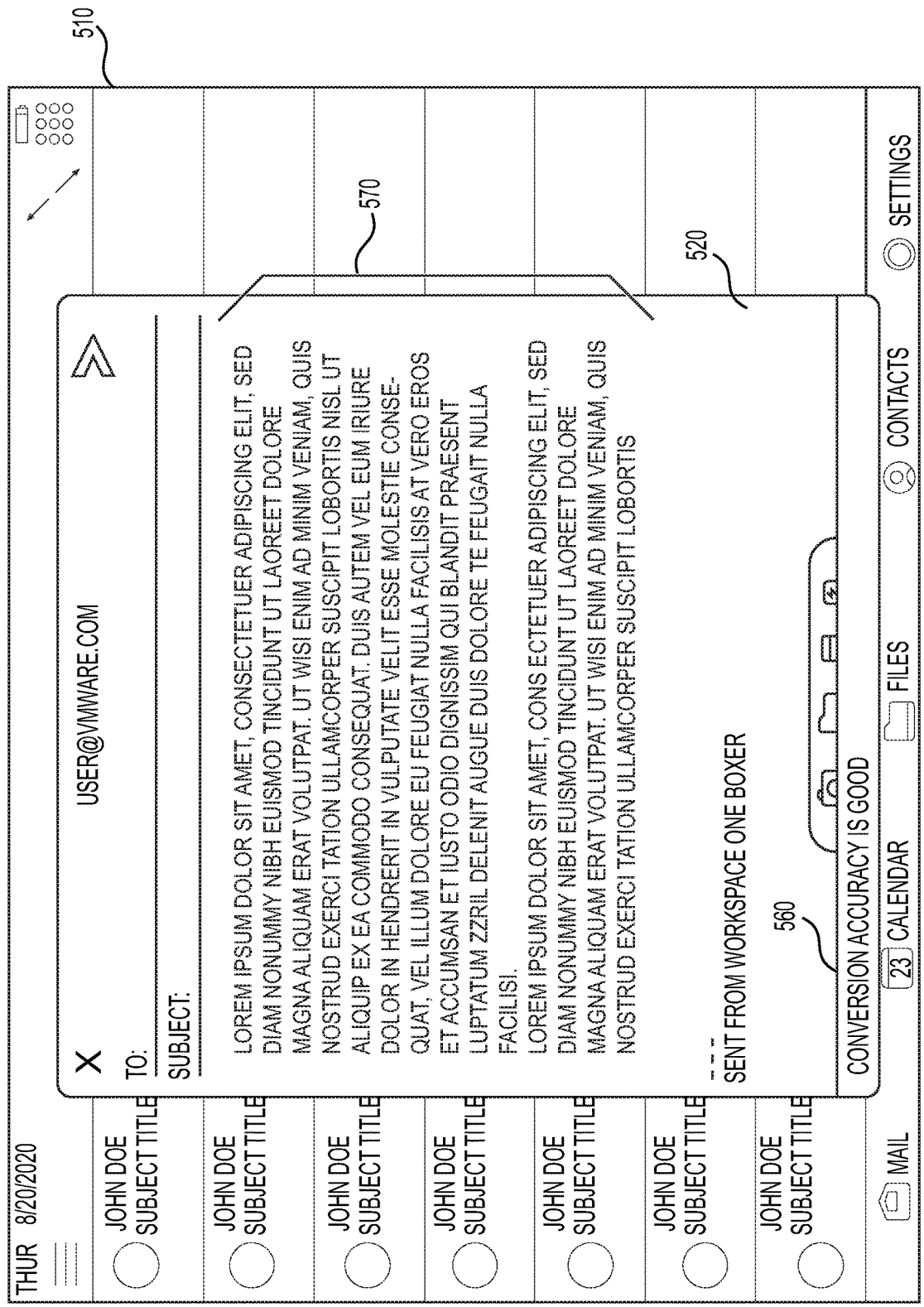
FIG. 5C is an illustration of an example GUI for importing text into a draft email on a user device.

In some examples, and as discussed further with respect to FIG. 5C, the user device 110 can display an indication of the conversion accuracy of the recognized text. The indication can be provided within the draft email 130 interface. The indication can provide a warning to the user when the conversion accuracy is poor. In some examples, at stage 350 the user device 110 pastes the recognized text into the draft email 130 based on the conversion accuracy being above a threshold. In some examples, at stage 350 the application 120 provides a prompt to the user, indicating that the conversion accuracy is poor and allowing the user to decide whether the text should still be pasted into the email. For example, the user can elect not to use the converted text if a message indicates that the conversion accuracy is poor.

Accuracy can be determined in various ways. In one example, accuracy is determined based on the percentage of words that are misspelled or otherwise not recognized by a spell checker. For example, if 95% of the text includes words that exist in a dictionary, such as a library stored on the user device 110, the application 120 can determine that the accuracy is good. Threshold levels can be set for good, fair, or poor accuracy. In another example, accuracy is determined based on modifications made to the text by a user. If the user modifies a subset of letters within a word or group of words—such as by modifying "I he" to "The"—this can indicate an accuracy problem with that word. The application 120 can search for similar recitations within the text to determine if a similar error exists elsewhere, and if so, whether the conversion accuracy should be modified to reflect a different accuracy level.

In another example, the application 120 can attempt to recognize prompts for action in the converted text. For example, the scanned text could include an event with a date or time. In response, the application 120 can create a calendar event or other actionable attachment to the draft email. This can allow the user to take a picture of an event flyer or calendar, for example, and send an automatically generated calendar invite to another user. In another example, the application 120 can recognize one or more time entries and create an attachment for importing time entries into a time entry program.

The recognition of prompts for action can be based on action templates that are stored locally at the user device, in an example. The action templates can be downloaded from a management server and can correspond to applications that are known to be installed on the user device. Different applications can have APIs that provide access to different actions. This can allow the application 120 to also perform actions in the backend of other applications, such as directly updating time entries rather than creating an attachment, in an example.

As another example, the converted text can include a word or phrase relevant to a particular backend system to which the user device 110 has access. For example, the word or phrase can be a project number corresponding to a particular project relevant to a backend system, such as JIRA. The application 120 can identify the backend system based on the format of the project number, for example. In one example, the application 120 can retrieve a link corresponding to the project number, through an API call for example, and insert the link into the text. In another example, the application 120 can attach a calendar item, project summary, or other document associated with the project number to the draft email 130.

In some examples, at stage 350 the application 120 can provide an option to the user regarding the text being imported into the draft email 130. For example, the application 120 can provide an option to paste the recognized text into the email 130, or alternatively, paste the image captured at stage 330 into the email 130. In this example, stage 345 can include sending either or both of the recognized text or the captured image to the application 120. In some examples, the user can be prompted with a selection mechanism between these two options. The selection mechanism can be presented before the information is imported into the email 130, such as by presenting a popup window that asks the user whether he or she would like the recognized text or the captured image imported into the email 130, along with a button corresponding to each option that the user can select to indicate their preference. Selection of one of those buttons can cause the text or image, as appropriate, to be pasted into the body of the email 130.

In some examples, the selection can be performed at a different stage by the user or by an administrator. For example, rather than being prompted by the application 120 at runtime, the user can previously define a setting associated with the application 120 to indicate such a selection. For example, the setting can indicate that imported text should always be pasted as recognized text, or alternatively, that the imported text should always be pasted as the captured image. In some examples, this setting can be controlled by an administrator. The administrator can indicate the selection at a management server that exerts management control over the user device 110 or the application 120, or both, causing the application 120 to make the indicated selection. In an example where the administrator makes the selection, the settings page of the application 120 can gray-out the selection option in the settings when accessed by the user of the device 110.

In some examples, the method can include providing an option to toggle between the captured image or the recognized text after either version is imported into the email 130. In one example, the option is an icon that hovers proximate to the imported image or text. The icon can toggle these two options directly in some examples, while in other examples selecting the icon reveals various options available to the user, including the option to toggle between the image and text. In that example, another option that can be revealed is the option to remove the image or text that has been imported into the email 130.

In yet another example, the user device 110 can examine the recognized text for any sensitive information and take an accompanying action based on whether sensitive information is present in the text. For example, after the text has been recognized at stage 340, the application 120 or the converter 150 can scan the recognized text for particular keywords. In one example, the keywords can be provided by an administrator. The keywords can include words indicating sensitive information, such as "confidential," "privileged," "secret," or words relating to the subject matter of sensitive topics. In some examples, based on the presence of one or more words indicating sensitive information, the application 120 can determine that the text should not be imported into the draft email 130. In another example, if one or more words indicating sensitive information are present, the user can be prompted with a notice of those sensitive words along with an option to continue the importing process or stop the process.

Figure 4:
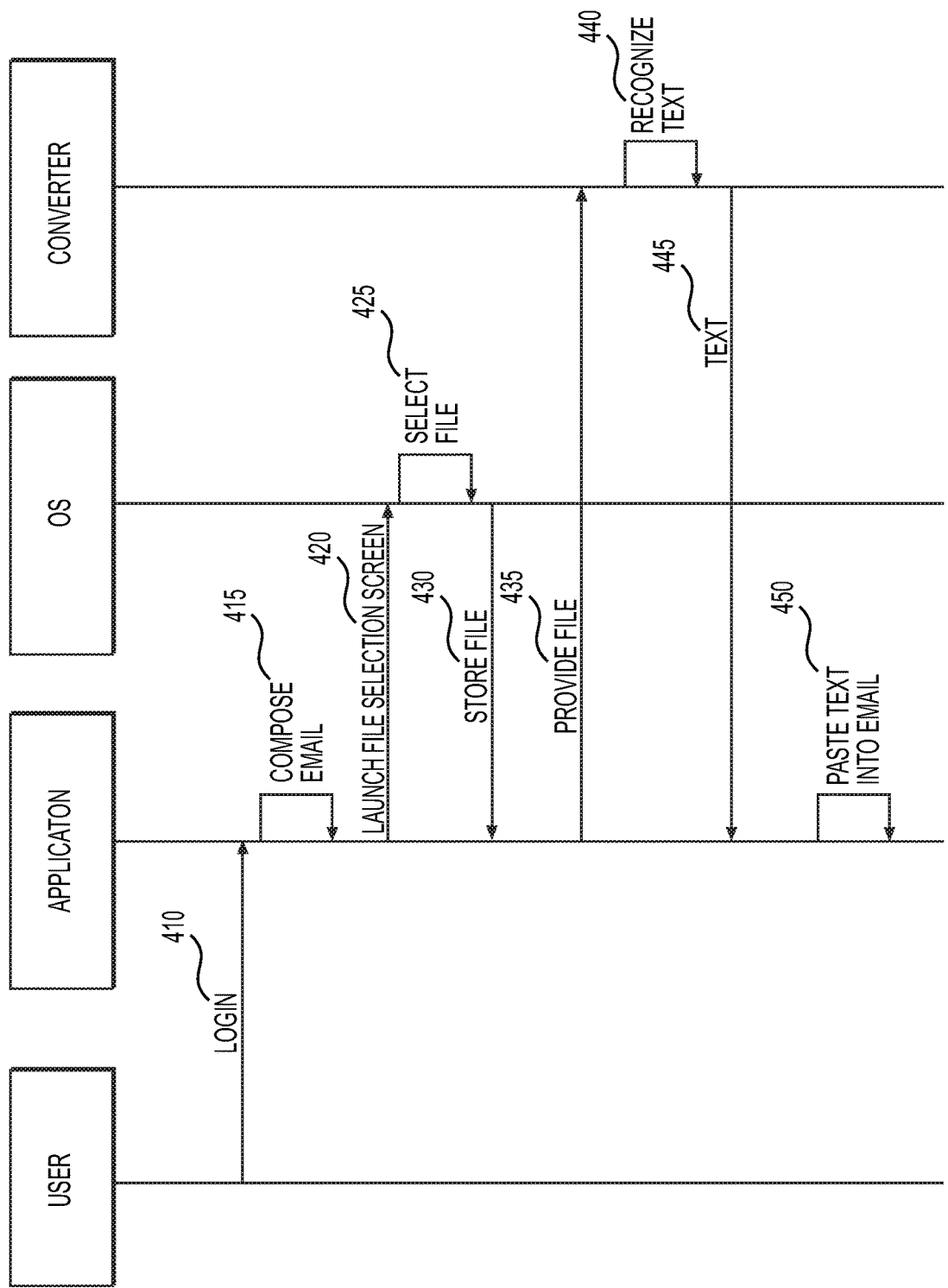
FIG. 4 is a sequence diagram of an example method for importing text into a draft email on a user device.

While FIG. 3 describes a process of capturing text using a camera 170, in some example methods a user can select an electronically stored document from which to import text. For example, the user can import text from a document saved on the user device 110 or stored remotely, such as at a content server. FIG. 4 provides such an example method.

At stage 410 of the example method, a user can log in to the application 120. As with the method of FIG. 3, this stage can include launching the application 120 and causing credentials to be provided to the application 120. While in some examples the user can manually type their credentials into an interface of the application 120, in other examples the credentials are provided as part of an SSO function. For example, a portal application that provides access to multiple applications can store the user's credentials and provide those credentials to the application 120. In some examples, the application 120 is accessed through the portal application. In other examples, the application 120 is a portal application.

At stage 415, the user can begin composing an email. This can be performed by, for example, selecting an option for a new email within the application 120 interface. That selection can launch a new window corresponding to a draft email. At stage 420, the application 120 can launch a file selection screen. This stage can be performed in response to a user selecting an interface element from the email application 120. In one example, the element is an icon corresponding to a file or file folder. The user can select the icon, causing the file selection screen to be displayed by the operating system. In some examples, the file selection screen is a separate application from the email application 120, such as a file explorer application.

At stage 425, the user can navigate through the file selection interface and select a desired file. In some examples, the file is stored on the user device 110. In other examples, the file is stored at a remote server but accessible to the user device 110. For example, the file can be stored at a content repository or content server associated with an enterprise of the user. In some examples, the file is stored at another device associated with the user, such as on a computer in the office.

Based on the user's selection of a file at stage 425, the operating system can provide the file to the application 120 at stage 430. In some examples, providing the file includes storing the file at the user device 110 in a location available to the application 120. In another example, providing the file includes providing the application 120 with access to the file, such that the application can query the storage location and obtain the file directly. In another example, the user can drag a file onto a region on the email composition interface, such as onto an icon or region dedicated to recognizing text in the document. This can help the user eliminate clicks and selections when a simple drag action is available.

At stage 435, the application 120 can provide the file to the converter 150. In some examples, this stage involves simply allowing the converter 150 to access the file, which can be stored at the user device as a result of stage 430. In some examples, stage 435 includes storing the file at a particular file storage location at the user device 110. The converter 150 can then recognize text within the document at stage 440.

In one example, the application can also provide coordinates that indicate only a region within the file for analysis. For example, if the user draws a box around a paragraph on page five of the document, the application can describe that region to the converter such that the converter can convert just the text in that region rather than for the entire document. This can save processing resources and time.

As explained with respect to FIG. 3, in one example, the converter 150 utilizes one or more machine-learning models to analyze the document. The machine-learning models can be stored on the user device 110, allowing the user device 110 to perform text recognition without contacting a remote server. This allows the example method to be performed irrespective of an internet or data connection for the user device 110. Performing the text recognition on the user device 110 also preserves bandwidth and speeds up the text recognition process.

While the machine-learning models utilized by the converter 150 can be stored on the user device 110, the models can be trained elsewhere. In one example, a machine-learning model is trained at a remote server using control information as an input to the model. After deployment to a user device 110, the machine-learning model can collect feedback from the user. For example, when a machine-learning model is used for text recognition and the user subsequently corrects an aspect of the recognized text, the user device 110 can identify that correction as feedback for the model. The correction can be provided to a training server, allowing for refinement of the model.

Various types of machine-learning models can be used to recognize text within the formatted file. For example, machine-learning models can use character detection, character recognition, neural-network text detection, neural-network text recognition, natural language processing, or a combination of these techniques.

At stage 445, the converter 150 can provide the recognized text to the application 120. This can be performed by utilizing functionality of the operating system, such as by copying the text to a temporary storage location, such as a clipboard, of the operating system. The operating system can then paste the text into the draft email 130 at stage 450, displaying the draft email 130 in the foreground of the interface along with the pasted text. The user can then interact with the text as desired, such as by formatting, editing, deleting, or adding to the text. Of course, the user can simply send the email without modifying the text in some examples.

In some examples, and as discussed further with respect to FIG. 5C, the user device 110 can display an indication of the conversion accuracy of the recognized text. The indication can be provided within the draft email 130 interface. The indication can provide a warning to the user when the conversion accuracy is poor. In some examples, at stage 450 the user device 110 pastes the recognized text into the draft email 130 based on the conversion accuracy being above a threshold. In some examples, at stage 350 the application 120 provides a prompt to the user, indicating that the conversion accuracy is poor and allowing the user to decide whether the text should still be pasted into the email. For example, the user can elect to use the converted text based on the message indicating that the conversion accuracy is fair or good.

FIG. 5A provides an illustration of an example GUI 510 for importing text into a draft email 520 on a user device 110. The GUI 510 depicted in FIG. 5A can be displayed by an email application 120 as described previously. In this example, the GUI 510 includes a draft email 520 overlaid on top of a user's inbox. The draft email 520 can be displayed based on the user selecting to draft a new email, reply to an existing email, or forward an existing email. The draft email 520 includes fields for a recipient ("TO") and subject line ("SUBJECT"), as well as a field for typing the body of the email.

The draft email 520 also includes selectable elements. For example, a first selectable element 530 is included toward the bottom of the draft email 520. In this example, the first selectable element 530 is an icon representing a camera. When the user selects the first selectable element 530, a camera interface can be launched. For example, as described with respect to stages 320 and 325 of FIG. 3, the application 120 can register with the converter 150 and the converter 150 can launch the camera 170 interface. FIG. 5B depicts such an example camera 170 interface.

In addition to the first selectable element 530, the draft email 520 also includes a second selectable element 540. In this example, the second selectable element 540 is an icon associated with a file folder. Selecting the second selectable element 540 can cause the operating system to launch a file selection screen, as described with respect to elements 420 and 425 of FIG. 4. In that example, the user can simply select the desired file and the text of that file will be pasted into the email, as shown at FIG. 5C.

FIG. 5B depicts an example camera 170 interface that can be displayed in response to a user selecting the first selectable element 530. In this example, the camera 170 is directed to a book that includes various text paragraphs. The user can capture an image of the book or other document using this interface, after which the interface displays multiple selectable anchors that form a selection area 550. In this example, the selectable anchors are circles at the corners of the selection area 550. In some examples, the user device 110 can display the selectable area 550 automatically, using machine learning to guess which portion of the document is of interest to the user.

The user can select and move each anchor individually. In the example of FIG. 5B, the user is currently manipulating the lower right anchor, causing it to display larger than the other three anchors. The user can make any number of adjustments to these anchors to place the selectable area 550 in a position that identifies the desired text. When the user is satisfied with the location of the selectable area 550, the user can select to "KEEP SCAN." If the user prefers to capture a new imagine instead, he or she can select the "RETAKE" option and capture a new image.

After the user finalizes the image and selectable area 550, the user device 110 can return to displaying the email application interface 510, as shown in FIG. 5C. As depicted, the email application interface 510 includes the same draft email 520 but with the recognized text 570 extracted from the image shown in FIG. 5B. The text 570 is pasted in an editable format within the email 520, allowing the user to modify the text 570 as desired.

In some examples, and as shown in FIG. 5C, the draft email 520 can include a conversion accuracy indication 560. In this example, the indication is displayed across the bottom of the draft email 520 and indicates that the conversion accuracy is "good."

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for importing text into a draft email on a user device, comprising
    displaying a draft email interface on a display of the user device;
    displaying, within the draft email interface, a first selectable element;
    in an instance where the first selectable element is selected, launching a camera interface on the display of the user device;
    capturing an image with the camera interface;
    recognizing text within the image;
    importing the recognized text into the draft email; and
    displaying a message, within the draft email interface, that provides an accuracy indication of one of at least three potential accuracy levels of the imported recognized text relative to the capture image.

2. The method of claim 1, further comprising receiving user input scaling the captured image to a smaller portion of the captured image, wherein recognizing text is performed on the smaller portion of the captured image.

3. The method of claim 1, further comprising, in an instance where the accuracy indication is the lowest accuracy of the at least three potential accuracy levels, prompting the user to decide whether to retain the imported text in the draft email.

4. The method of claim 1, wherein recognizing text within the image is performed by a machine learning model.

5. The method of claim 1, wherein recognizing text within the image is performed at the user device.

6. The method of claim 1, further comprising:
    displaying, within the draft email interface, a second selectable element;
    in an instance where the second selectable element is selected, launching a file-storage interface;
    receiving a selection of a file through the file-storage interface;
    recognizing text within the file; and
    importing the recognized text into the draft email interface.

7. The method of claim 6, wherein the file is stored remotely from the user device.

8. A non-transitory, computer-readable medium containing instructions that, when executed by a hardware-based processor, performs stages for importing text into a draft email on a user device, the stages comprising:
    displaying a draft email interface on a display of the user device;
    displaying, within the draft email interface, a first selectable element;
    in an instance where the first selectable element is selected, launching a camera interface on the display of the user device;
    capturing an image with the camera interface;
    recognizing text within the image;
    importing the recognized text into the draft email; and
    displaying a message, within the draft email interface, that provides an accuracy indication of one of at least three potential accuracy levels of the imported recognized text relative to the capture image.

9. The non-transitory, computer-readable medium of claim 8, the stages further comprising receiving user input scaling the captured image to a smaller portion of the captured image, wherein recognizing text is performed on the smaller portion of the captured image.

10. The non-transitory, computer-readable medium of claim 8, the stages further comprising, in an instance where the accuracy indication is the lowest accuracy of the at least three potential accuracy levels, prompting the user to decide whether to retain the imported text in the draft email.

11. The non-transitory, computer-readable medium of claim 8, wherein recognizing text within the image is performed by a machine learning model.

12. The non-transitory, computer-readable medium of claim 8, wherein recognizing text within the image is performed at the user device.

13. The non-transitory, computer-readable medium of claim 8, the stages further comprising:
 displaying, within the draft email interface, a second selectable element;
 in an instance where the second selectable element is selected, launching a file-storage interface;
 receiving a selection of a file through the file-storage interface;
 recognizing text within the file; and
 importing the recognized text into the draft email interface.

14. The non-transitory, computer-readable medium of claim 13, wherein the file is stored remotely from the user device.

15. A system for importing text into a draft email, comprising:
 a memory storage including a non-transitory, computer-readable medium comprising instructions; and
 a user device including a hardware-based processor that executes the instructions to carry out stages comprising:
  displaying a draft email interface on a display of the user device;
  displaying, within the draft email interface, a first selectable element;
  in an instance where the first selectable element is selected, launching a camera interface on the display of the user device;
  capturing an image with the camera interface;
  recognizing text within the image;
  importing the recognized text into the draft email; and
  displaying a message, within the draft email interface, that provides an accuracy indication of one of at least three potential accuracy levels of the imported recognized text relative to the capture image.

16. The system of claim 15, the stages further comprising receiving user input scaling the captured image to a smaller portion of the captured image, wherein recognizing text is performed on the smaller portion of the captured image.

17. The system of claim 15, the stages further comprising, in an instance where the accuracy indication is the lowest accuracy of the at least three potential accuracy levels, prompting the user to decide whether to retain the imported text in the draft email.

18. The system of claim 15, wherein recognizing text within the image is performed by a machine learning model.

19. The system of claim 15, wherein recognizing text within the image is performed at the user device.

20. The system of claim 15, the stages further comprising:
 displaying, within the draft email interface, a second selectable element;
 in an instance where the second selectable element is selected, launching a file-storage interface;
 receiving a selection of a file through the file-storage interface;
 recognizing text within the file; and
 importing the recognized text into the draft email interface.

\* \* \* \* \*